United States Patent [19]

Kusuki et al.

[11] Patent Number: 5,286,539
[45] Date of Patent: Feb. 15, 1994

[54] GAS SEPARATING ASYMMETRIC MEMBRANE

[75] Inventors: Yoshihiro Kusuki; Toshimune Yoshinaga; Harutoshi Hoshino; Shinji Asanuma, all of Chiba, Japan

[73] Assignee: Ube Industries, Ltd., Yamaguchi, Japan

[21] Appl. No.: 942,287

[22] Filed: Sep. 9, 1992

[30] Foreign Application Priority Data

Sep. 10, 1991 [JP] Japan .................... 3-307259

[51] Int. Cl.$^5$ .................... B32B 27/00; C08G 69/26
[52] U.S. Cl. .................... 96/10; 428/35.7; 428/36.9; 428/473.5; 428/36.5; 528/352; 528/353; 210/500.1; 210/500.21; 210/500.23; 210/500.39; 96/13
[58] Field of Search .................... 528/353, 352; 428/473.5, 35.7, 36.5, 36.9; 55/158, 16; 210/500.1, 500.21, 500.23, 500.39

[56] References Cited

U.S. PATENT DOCUMENTS 4,690,873 9/1987 Makino et al. .................... 428/473.5
4,954,611 9/1990 Chen, Sr. et al. .................... 528/353

FOREIGN PATENT DOCUMENTS 1181829 6/1985 Japan .

Primary Examiner—John Kight, III
Assistant Examiner—T. Mosley
Attorney, Agent, or Firm—McAulay Fisher Nissen Goldberg & Kiel

[57] ABSTRACT

A gas separating asymmetric membrane such as a gas separating asymmetric hollow fiber comprises an aromatic polyimide comprising recurring units of the formulae (I) and (II):

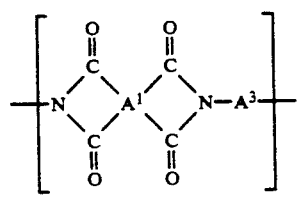

(I)

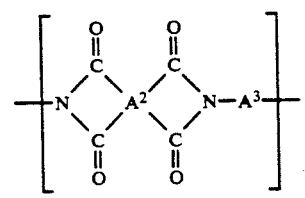

(II)

wherein $A^1$ is a tetravalent unit having a diphenylhexafluoropropane structure, $A^2$ is a tetravalent unit having a benzene structure, and $A^3$ is a divalent aromatic unit which is a unit derived from a sulfur atom-containing diamine such as diaminodibenzothiophene, diaminodiphenylenesulfone, diaminothioxanthene-5,5-dioxide or diaminothioxanthone-5,5-dioxide. The aromatic polyimide contains the recurring unit of the formula (I) in an amount of 40 to 90 molar % and the recurring unit of the formula (II) in an amount of 10 to 40 molar %. Further, a process for the preparation of the gas separating asymmetric hollow fiber membrane is also disclosed.

13 Claims, No Drawings

GAS SEPARATING ASYMMETRIC MEMBRANE

BACKGROUND OF THE INVENTION

1. Field of Invention

The present invention relates to a gas separating asymmetric membrane comprising an aromatic polyimide. Particularly, the invention relates to a gas separating asymmetric membrane (including a gas separating asymmetric hollow fiber membrane) exhibiting an excellent gas transmission property (e.g., gas transmission rate) and an improved mechanical property. The invention also relates to a process for the preparation of such excellent gas separating asymmetric membrane.

2. Description of Prior Art

It has been previously known the process to prepare an asymmetric gas separating membrane (including an asymmetric hollow fiber membrane) having a homogeneous surface layer on one side and a porous layer on another side by a wet membrane-forming method. In the method, a coagulation liquid and a dope solution of an aromatic polyimide made from the aromatic tetracarboxylic acid component comprising mainly biphenyltetracarboxylic dianhydride and an aromatic diamine component comprising mainly an aromatic diamine having —$SO_2$— group in its molecular structure are used. For example, the process is disclosed in U.S. Pat. No. 4,690,873.

A gas separating asymmetric membrane of the biphenyltetracarboxylic acid-type aromatic polyimide not only has good heat and chemical resistance but also shows excellent gas selectivity, particularly, for collecting carbon dioxide gas from a gaseous mixture. However, the membrane does not always exhibit satisfactory gas transmission rates when it is used for separating various gaseous mixtures in practical uses. Therefore, it is desired to develop a gas separating asymmetric membrane exhibiting improved gas transmission rate.

In U.S. Pat. No. 3,822,309, No. 3,899,309, No. 4,705,540 and No. 4,717,394, a polyimide gas separating membrane of aromatic polyimide in the form of a homogeneous body which is prepared from an aromatic diamine having one or two benzene rings and an aromatic tetracarboxylic acid component such as pyromellitic dianhydride, benzophenonetetracarboxylic dianhydride, biphenyltetracarboxylic dianhydride or 2,2-bis(3,4-dicarboxyphenyl)hexafluoropropanic dianhydride (hereinafter referred to as "6-FDA") is disclosed.

As for 6-FDA, it is apt to give a polyimide of an unfavorably low molecular weight when it is caused to react with an aromatic diamine having one benzene ring such as 1,3-diamino-4,6-dimethylbenzene. Otherwise, 6-FDA cannot give a polyimide gas separating membrane having both high gas permeation ratio and high gas selectivity, when it is caused to react with an 4,4'-diaminodiphenylether or 4,4'-diaminodiphenylmethane.

In "Polymer Preprints", Peggy Cebe et al, Vol. 29, No. 1, 130 (1988), it is described that polyimide molding (e.g., film) using 6-FDA as an acid component is inferior to others in mechanical property from measurement of mechanical characteristics of various aromatic polyimide films. In practice uses, a gas separating asymmetric hollow fiber membrane consisting of 6-FDA-type polyimide is apt to be destroyed or ruptured, when it receives a relatively strong pressure in a procedure for its preparation process or its converging procedure for module of fiber. Therefore, it is desired to develop a gas separating membrane having both an excellent gas transmission property such as high gas transmission rate and selective permeability (selectivity) and an improved mechanical property.

Hence, U.S. Pat. No. 5,042,992 discloses a polyimide gas separating asymmetric membrane of aromatic polyimide which is prepared from 6-FDA and 3,7-diamino-2,8-dimethyldiphenylenesulfone. According to the study by the present inventors, however, the membrane does not also sufficiently satisfy properties of both the gas transmission property and the improved mechanical property, particularly does not exhibit excellent mechanical property.

Further, the specification of the application Ser. No. 835,605, filed Feb. 13, 1992 now abandoned, describes a polyimide gas separating asymmetric membrane of aromatic polyimide which is prepared from 6-FDA and a sulfur atom-containing diamine such as diaminodibenzothiophene, diaminodiphenylenesulfone or diaminothioxanthene-5,5-dioxide and an aromatic diamine having at least two benzene rings. The above application is a continuation-in-part of Ser. No. 669,523, filed Mar. 14 1991, now abandoned.

SUMMARY OF THE INVENTION

An object of the present invention is to provide a gas separating asymmetric membrane which is made of a new aromatic polyimide and which has excellent durability such as high heat and chemical resistance and which exhibits not only a gas transmission property of a high selective permeability (a high gas selectivity) and a high gas transmission rate (e.g., an oxygen gas transmission rate) superior to those of known polyimide gas separating membranes but also an improved mechanical property.

Another object of the present invention is to provide a process by which the above gas separating asymmetric membrane can be prepared easily with high reproducibility.

The invention resides in a gas separating asymmetric membrane (such as a gas separating asymmetric hollow fiber membrane) comprising an aromatic polyimide of which recurring unit is expressed by the formula (1):

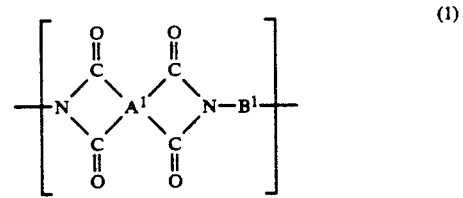

wherein $A^1$ is a tetravalent unit 40 to 90 molar % of which has a diphenylhexafluoropropane structure expressed by the formula (III):

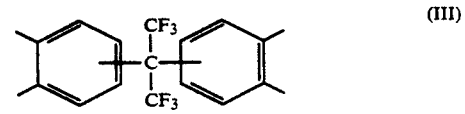

and 10 to 40 molar % of which has a benzene structure expressed by the formula (IV):

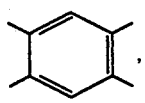 (IV)

and B¹ is a divalent unit at least 35 molar % of which is at least one unit selected from the group consisting of a unit expressed by the formula (VI):

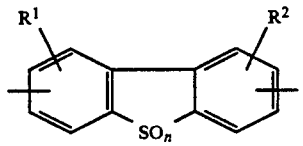 (VI)

in which R¹ and R² independently represent hydrogen or an organic group and n is 0, 1 or 2, and a unit expressed by the formula (VII):

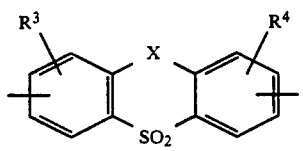 (VII)

in which R³ and R⁴ independently represent hydrogen or an organic group and X is —CH₂— or —CO—.

In more details, the above gas separating asymmetric membrane is composed of an aromatic polyimide comprising recurring units of the formulae (I) and (II):

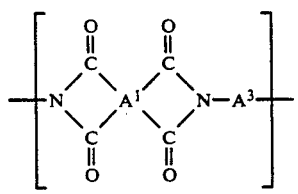 (I)

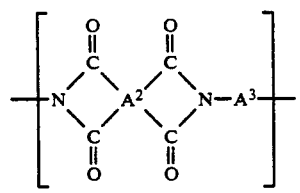 (II)

wherein
A¹ is a tetravalent unit having a diphenylhexafluoropropane structure expressed by the formula (III):

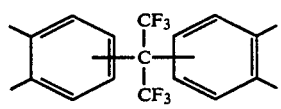 (III)

A² is a tetravalent unit having a benzene structure expressed by the formula (IV):

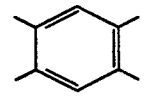 (IV)

and
A³ is a divalent unit selected from the group consisting of a unit expressed by the formula (VI):

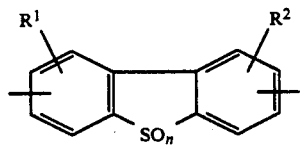 (VI)

in which R¹ and R² independently represent hydrogen or an organic group and n is 0, 1 or 2, and a unit expressed by the formula (VII):

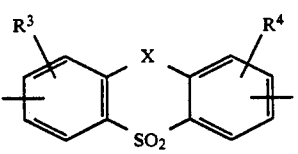 (VII)

in which R³ and R⁴ independently represent hydrogen or an organic group and X is —CH₂— or —CO—, said aromatic polyimide containing the recurring unit of the formula (I) in an amount of 40 to 90 molar % and the recurring unit of the formula (II) in an amount of 10 to 40 molar %.

Preferably, each of the organic group for R¹, R², R³, and R⁴ is an alkyl group having 1-6 carbon atoms such as methyl, ethyl, n-propyl, isopropyl, n-butyl, isobutyl, pentyl or hexyl, an alkoxy group having 1-6 carbon atoms such as methoxy, ethoxy or isopropoxy, or a hydroxyalkyl group having 1-6 carbon atoms such as hydroxymethyl, hydroxyethyl or hydroxypropyl.

The invention also resides in a gas separating asymmetric membrane of an organic polyimide comprising recurring units of the formulae (I), (II), (VIII) and (IX):

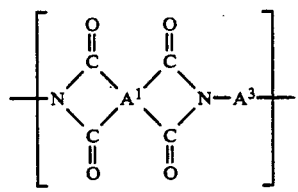 (I)

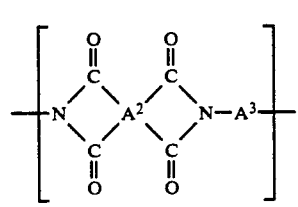 (II)

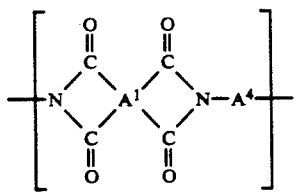

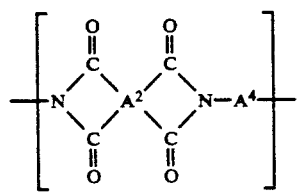

wherein $A^1$ is a tetravalent unit having a diphenylhexafluoropropane structure expressed by the formula (III):

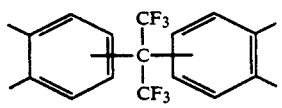

$A^2$ is a tetravalent unit having a benzene structure expressed by the formula (IV):

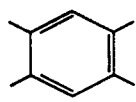

$A^3$ is a divalent unit selected from the group consisting of a unit expressed by the formula (VI):

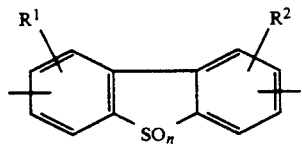

in which $R^1$ and $R^2$ independently represent hydrogen or an organic group and n is 0, 1 or 2, and a unit expressed by the formula (VII):

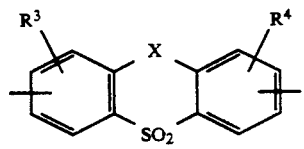

in which $R^3$ and $R^4$ independently represent hydrogen or an organic group and X is —$CH_2$— or —CO—, and $A^4$ is a divalent unit which is obtained by eliminating amino groups from an aromatic diamine having at least two benzene rings, said aromatic polyimide containing the recurring units of the formulae (I) and (VIII) in an amount of 40 to 90 molar %, the recurring units of the formulae (II) and (IX) in an amount of 10 to 40 molar %, and the recurring units of the formulae (I) and (II) in an amount of not less than 35 molar %.

The gas separating asymmetric membrane of the invention can be prepared by a process which comprises the steps of:

preparing a dope solution of an aromatic polyimide which comprises recurring units expressed by the above-mentioned formulae (I) and (II) or the above formulae (I), (II), (VIII) and (IX) dissolved in a polar organic solvent, coating the dope solution on a substrate (e.g., a surface of a horizontally positioned film forming plate, or a peripheral surface of a rotating film-forming drum), and introducing the substrate together with the dope solution into a coagulation liquid (which is compatible with the polar organic solvent of the aromatic polyimide but does not dissolve the aromatic polyimide therein) to form a coagulated gas separating asymmetric membrane. Specifically, the gas separating asymmetric hollow fiber membrane of the invention can be prepared by a process which comprises the steps of:

preparing a dope solution of an aromatic polyimide which comprises recurring units expressed by the above-mentioned formula (I) and (II) or the above formulae (I), (II), (VIII) and (IX) dissolved in a polar organic solvent, extruding the dope solution from a spinning nozzle in the form of a hollow filament, and introducing the hollow filament into a coagulation liquid (which is compatible with the polar organic solvent of the aromatic polyimide but does not dissolve the aromatic polyimide therein) to form a coagulated gas separating hollow fiber membrane.

DETAILED DESCRIPTION OF THE INVENTION

The gas separating asymmetric membrane of the invention is made of an aromatic polyimide consisting essentially of a combination of the recurring units expressed by the above formulae (I) and (II) or a combination of the recurring units expressed by the above formulae (I), (II), (VIII) and (IX) and comprises a very thin (preferably, 0.001–5 μm) homogeneous layer (i.e., dense layer), which directly influences to the gas selectivity, and a comparatively thick (preferably, about 10–2,000 μm) porous layer, which supports the homogeneous layer, in the membrane body. The membrane of the invention is generally employed in the form of a gas separating asymmetric hollow fiber membrane (i.e., gas separating asymmetric hollow filament) or in the form of a plain sheet through which the aimed gas in a gaseous mixture can permeate selectively. Therefore, the gas separating asymmetric membrane of the invention shows not only high gas permeation selectivity but also high gas transmission rate.

Aromatic polyimides other than the aromatic polyimide of the invention are disadvantageous as the material for the gas separation asymmetric membrane, because some such polymer having high molecular weight can not be easily prepared, some such polyimides are insoluble in polar organic solvents, and it is difficult to prepare some such polyimide solution suitable for forming gas separating asymmetric membranes. Even if some gas separating asymmetric membranes using such polyimides can be formed, their oxygen gas transmission rates are less than the practically desired level such as $5 \times 10^{-5}$ cm$^3$/cm$^2$.sec.cmHg or their mechanical properties are not satisfied particularly in elongation of tensile test because the elongation values are less than 10%.

Further, some 6-FDA-type aromatic polyimides are also known as described hereinbefore. According to the study by the present inventor, however, the known 6-FDA-type aromatic polyimides have some disadvantages. For example, a polymer having high molecular weight can be hardly prepared in the case where some of the indicated aromatic amine components are used, and even if a polyimide solution is prepared, it is very difficult to form with high reproducibility a gas separating asymmetric membrane exhibiting both excellent gas transmission property such as a high gas transmission rate and gas selectivity and an improved mechanical property such as elongation.

The gas separating asymmetric membrane of the aromatic polyimide according to the invention is free from the above disadvantages. In the gas separating asymmetric membrane of the aromatic polyimide having the recurring units of the formulae (I) and (II), the recurring unit of the formula (I) is contained in an amount of 40 to 90 molar % in the polyamide, and the recurring unit of the formula (II) contained in an amount of 10 to 40 molar %. The recurring unit of the formula (I) is preferably contained in an amount of 45 to 90 molar %, more preferably in an amount of 50 to 90 molar %. The recurring unit of the formula (II) is preferably contained in an amount of 10 to 35 molar %.

In the gas separating asymmetric membrane of the aromatic polyimide having the recurring units of the formulae (I), (II), (VIII) and (IX), the recurring units of the formulae (I) and (VIII) are contained in an amount of 40 to 90 molar % in the polyamide, the recurring units of the formulae (II) and (IX) contained in an amount of 10 to 40 molar %, and the recurring units of the formulae (I) and (II) contained in an amount of not less than 35 molar %. The recurring units of the formulae (I) and (VIII) are preferably contained in an amount of 45 to 90 molar %, more preferably in an amount of 50 to 90 molar %. The recurring units of the formulae (II) and (IX) are preferably contained in an amount of 10 to 35 molar %. The recurring units of the formulae (I) and (II) are preferably contained in an amount of 70 to 95 molar % and the recurring units of the formulae (VIII) and (IX) are preferably contained in an amount of 5 to 30 molar %.

The aromatic polyimide, as a tetravalent unit other than the units expresented by A¹ and A², may contain a biphenyl structure expressed by the formula (V):

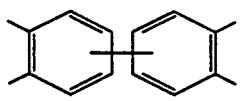
(V)

The aromatic polyimide having the recurring units of the above formulae (I) and (II) or the above formulae (I), (II), (VIII) and (IX) can be prepared, for example, by polymerization and imidization, in an organic polar solvent, of the aromatic tetracarboxylic acid component consisting of 2,2-bis(3,4-dicarboxyphenyl)hexafluoropropane or its acid dianhydride or its lower alcohol esters in an amount of 40 to 90 molar %, preferably 45 to 90 molar %, more preferably 50 to 90 molar %, pyromellitic acid or its acid dianhydride or its lower alcohol esters in an amount of 10 to 40 molar %, preferably 10 to 35 molar %, and biphenyltetracarboxylic acid or its derivative such as its acid dianhydride or its ester, for the rest (not more than 50 molar %, preferably 10 to 40 molar %); with the aromatic diamine component consisting of aromatic diamine compounds expressed by the following formulae (X) and/or (XI):

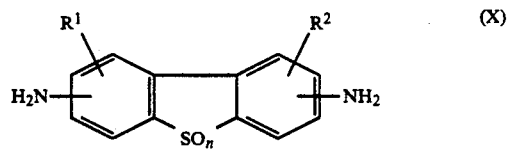
(X)

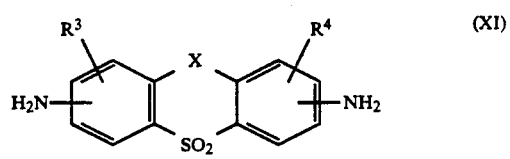
(XI)

(wherein $R^1$, $R^2$, $R^3$, $R^4$, n and X are the same as defined in the formulae (VI) and (VII)) in an amount of not less than 35 molar %, preferably not less than 40 molar %, and other aromatic diamine compounds having at least two benzene rings for the rest, in approximately equal molar amount to that of the acid component.

Examples of preferable biphenyltetracarboxylic acids in the above aromatic tetracarboxylic acid component include 2,3,3',4'-biphenyltetracarboxylic acid, its acid dianhydride, 3,3',4,4'-biphenyltetracarboxylic acid and its acid dianhydride.

Together with the above compounds, employable for the tetracarboxylic acid component are biphenylethertetracarboxylic acids and their reactive derivatives such as 3,3',4,4'biphenylethertetracarboxylic acid and its acid dianhydride, and benzophenonetetracarboxylic acids and their reactive derivatives such as 3,3',4,4'-benzophenonetetracarboxylic acid and its acid dianhydride, on condition that their amounts are so small as not exceed 10 molar % (preferably employed in the amount of not more than 5 molar %).

Preferable examples of aromatic diamine compounds expressed by the above formula (X) include diaminobenzothiophenes expressed by the formula (XII):

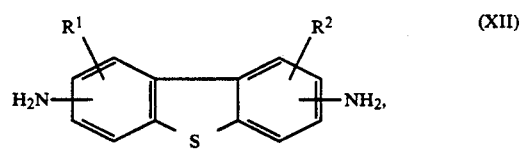
(XII)

which is the case that n is 0 in the formula (X), and diaminodiphenylenesulfones expressed by the formula (XIII):

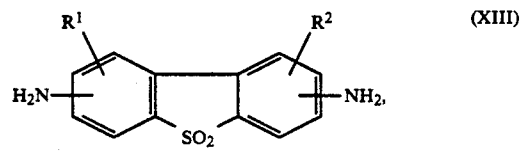
(XIII)

which is the case that n is 2 in the formula (X).

Examples of the above diaminobenzothiophenes (expressed by the formula (XII)) include 3,7-diamino-2,8-dimethyl-dibenzothiophene, 2,8-diamino-3,7-dimethyldibenzothiophene, 3,7-diamino-2,6-dimethyl-dibenzothiophene and 3,7-diamino-2,8-diethyl-dibenzothiophene.

Examples of the above diaminodiphenylenesulfones (expressed by the formula (XIII)) include 3,7-diamino-2,8-dimethyl-diphenylenesulfone, 3,7-diamino-2,8-diethyl-diphenylenesulfone, 3,7-diamino-2,8-dipropyl-diphenylenesulfone, 3,7-diamino 2,8-dimethoxy-diphenylenesulfone and 2,8-diamino-3,7-dimethyl-diphenylenesulfone.

Examples of diaminothioxanthene 5,5-dioxides, of which structures are expressed by the formula (XI) in which X is —$CH_2$—, include 3,7-diamino-thioxanthene-5,5-dioxide, 2,8-diamino-thioxanthene 5,5-dioxide and 3,7-diamino-2,8-dimethyl-thioxanthene-5,5-dioxide.

Examples of diaminothioxanthone-5,5-dioxides, of which structures are expressed by the formula (XI) in which X is —CO—, include 3,7-diamino-thioxanthone5,5-dioxide and 2,8-diamino-thioxanthone-5,5-dioxide.

Examples of the aromatic diamine compounds having a plural number of benzene rings employable as the above-mentioned aromatic diamine component together with the aromatic diamine compounds expressed by the formulae (X) and (XI) include diaminodiphenylether compounds such as 4,4'-diaminodiphenylether, 3,3'-dimethyl-4,4'-diaminodiphenylether, 3,3'-dimethoxy-4,4'-diaminodiphenylether and 3,3'-diaminodiphenylether; diaminodiphenylmethane compounds such as 4,4'-diaminodiphenylmethane and 3,3'-diaminodiphenylmethane; diaminobibenzyl compounds such as 4,4'-diaminobibenzyl and 4,4'-diamino-2,2'-dimethylbibenzyl; diaminobenzophenone compounds such as 4,4'-diaminobenzophenone and 3,3'-diaminobenzophenone; bis (aminophenyl)propane compounds such as 2,2-bis(4-aminophenyl)propane and 2,2 bis(3-aminophenyl)propane; and benzidine compounds such as 3,3'-dimethylbenzidine and 3,3'-dimethoxybenzidine.

Aromatic diamine having a benzene ring or a pyridine ring such as o-, m-, and p-phenylenediamine, 3,5-diamino benzoic acid and 2,6-diaminopyridine can be used as a portion (approximately not more than 10 molar %) of the aromatic diamine component.

Particularly preferred aromatic polyimides employable for the gas separating membrane of the invention are prepared from the aromatic tetracarboxylic acid component consisting of 2,2-bis(3,4-dicarboxyphenyl)-hexafluoropropane, its acid dianhydride or its lower alcohol ester in an amount of 45–90 molar %, preferably 50–90 molar %, pyromellitic acid, its acid dianhydride or its lower alcohol esters in an amount of 10–40 molar %, preferably 10–35 molar %, and 3,3',4,4'-biphenyltetracarboxylic acid, its acid dianhydride for the rest; and the aromatic diamine component consisting of the aromatic diamine compound expressed by the above formulae (X) and/or (XI) in an amount of not less than 50 molar %, preferably 70–100 molar %, particularly preferably 70–95 molar %, and the aromatic diamine compound having a plural number of benzene rings (diaminodiphenylethers are particularly preferred) for the rest, preferably 5–30 molar %. The aromatic polyimides prepared in the above-described manner are excellently soluble in polar organic solvent. The polymer solution prepared by the combination of the aromatic polyimide of the invention and the polar organic solvent is very suitable for forming a gas separating asymmetric membrane, and furthermore, a gas separating asymmetric membrane such as a gas separating asymmetric hollow fiber membrane made of such aromatic polyimide exhibits excellent durability (heat and chemical resistance) and excellent gas transmission such as high gas transmission rate and gas selectivity as well as improved mechanical property.

A logarithmic viscosity of the aromatic polyimide in the above aromatic polyimide solution is preferably within a range of 0.1–7, more preferably 0.2–5 at the temperature of 30° C. (at concentration: 0.5 g/100 ml; solvent: mixed solvent consisting of 4 parts by volume of p-chlorophenol and 1 part by volume of o-chlorophenol).

The dope solution of the aromatic polyimide of the invention can be prepared by dissolving the aromatic polyimide in a polar organic solvent. This polar organic solvent should dissolve the organic polyimide homogeneously therein and should be compatible with a coagulation liquid which is used at a later stage. The polar organic solvent preferably has a melting point of not higher than 200° C., and more preferably has a melting point of not higher than 150° C. Examples of such preferred polar organic solvents include phenols such as phenol, cresol and xylenol, catechols having two hydroxyl groups on their benzene ring, and halogenated phenols such as 3-chlorophenol, 4-chlorophenol, 4-bromophenol and 2-chloro-5-hydroxytoluene, and amide solvents such as N-methyl-2-pyrrolidone, N,N-dimethylformamide, N,N-diethylformamide, N,N-dimethylacetamide and N,N-diethylacetamide. The polar organic solvents can be used in combination. A reaction solution in which the tetracarboxylic acid components and the aromatic diamine components have been caused to react in a polar organic solvent to give the aromatic polyimide of the invention can be used as a dope solution.

From the viewpoint of extruding the aromatic polyimide solution from a spinning nozzle, a solution viscosity (in terms of rotational viscosity) of the dope solution to be used for spinning hollow filament in the process for the preparation of the gas separating hollow fiber membrane of the invention is desired to be within a range of 10–20,000 P (poise), preferably 50–10,000 P, more preferably 100–8,000 P, at the temperature adopted in the spinning process. Such solution viscosity is also advantageous in extruding the dope solution through a die to coat the solution on a substrate.

A coagulation liquid used in the preparation of the gas separating asymmetric membrane of the invention is a polar solvent which does not substantially dissolve the aromatic polyimide and which is compatible with the solvent of the aromatic polyimide solution. Examples of the coagulation liquid include water; lower aliphatic alcohols such as methanol, ethanol, propanol and isopropanol; ketones such as acetone, methyl ethyl ketone, diethyl ketone and ethyl propyl ketone; and the mixtures of water and polar organic solvents such as lower alcohols and ketones.

A preferred process for the preparation of the gas separating asymmetric hollow fiber membrane of the invention, for example, comprises the steps of:

extruding the aromatic polyimide-dope solution to an air from a spinning nozzle to form a hollow filament, introducing the hollow filament into a primary coagulation liquid kept at −10° C. to 60° C. which is placed just under the top of the spinning nozzle to coagulate the surface of the hollow filament and render the hollow filament self-supporting to retain its shape;

placing the filament around a guide roll, supplying the filament from the guide roll to a pair of guide rolls placed in a secondary coagulation liquid to thoroughly coagulate the filament up to the inside of the filament; and winding up the thoroughly coagulated hollow filament by means of a pulling roller.

The widing-up of the coagulated filament is preferably performed at a rate of approximately 2-80 m/minute.

Preferably, the gas separating asymmetric hollow fiber membrane prepared in the above process is subsequently subjected to an additional treatment which comprises the steps of:

replacing the coagulation liquid remaining in the form of the hollow fiber membrane thoroughly with a substituent solvent of an aliphatic hydrocarbon such as iso-pentane, n-hexane, iso-octane and n-heptane, and drying the hollow fiber membrane (which swells with the substituent solvent) by evaporating the solvent to give a dry asymmetric hollow fiber membrane. Preferably, the dry asymmetric hollow fiber is then heat-treated at a temperature below the softening point or the second order transition point of the employed aromatic polyimide.

The polyimide gas separating asymmetric membrane of the present invention is made of a special soluble aromatic polyimide prepared from the tetracarboxylic acid component mainly containing 2,2-bis(3,4-dicarboxyphenyl)hexafluoropropane or its acid dianhydride and pyromellitic acid or its acid dianhydride, and the sulfur atom-containing diamine component mainly containing diaminobenzothiophenes, diaminodiphenylenesulfones, diaminothioxanthenes and/or diaminothioxanthones.

The gas separating asymmetric membrane such as a gas separating asymmetric hollow fiber membrane according to the invention exhibits not only high gas selectivities (e.g., $PH_2/PCH_4 \leq 50$, $PH_2/PN_2 \leq 30$) for separating hydrogen gas, oxygen gas, methane gas and carbon dioxide gas from the mixture gas containing these gases, but also excellent gas transmission rates for these gases (e.g., hydrogen gas transmission rate $PH_2 \leq 70 \times 10^{-5}$ cm$^3$/cm$^2$.sec.cmHg).

Further, the gas separating asymmetric hollow membrane exhibits excellent mechanical property, particularly high elongation in tensile test (not less than 10%).

Furthermore, the above-described gas separating asymmetric membrane made of aromatic polyimide can be prepared easily with high reproducibility according to the process of the present invention.

The present invention is further explained below in detail by reference examples and examples, but those examples are given by no means to restrict the invention.

REFERENCE EXAMPLE 1 (PREPARATION OF POLYIMIDE)

A separable flask equipped with a stirrer and a conduit for introducing thereinto nitrogen gas, was charged with a mixture of 20 mmol of 2,2-bis(3,4-dicarboxyphenyl)-hexafluoropropanic dianhydride, 20 mmol of pyromellitic dianhydride, 59 mmol of 3,3',4,4'-biphenyltetracarboxylic dianhydride, 90 mmol of 3,7-diaminodimethyldiphenylene sulfone, 10 mmol of 4,4'-diaminodiphenylether and 323 g of p-chlorophenol. The reaction mixture was subjected to a polymerization procedure at 180° C. for 16 hours while the mixture was stirred and nitrogen gas flowed through the conduit and flask to prepare a solution of an aromatic polyimide at a concentration of 15 wt. %.

The viscosity (rotational viscosity) of the obtained aromatic polyimide solution was found to be 1,135 P and 1,581 P at temperatures of 100 and 90° C., respectively.

The logarithmic viscosity of the polymer in the aromatic polyimide solution was also found to be 1.2 (at concentration: 0.5 g/100 g solvent; solvent: mixed solvent consisting of 4 parts by volume of p-chlorophenol and 1 part by volume of o-chlorophenol).

REFERENCE EXAMPLES 2-10 (PREPARATION OF POLYIMIDE)

Various aromatic polyimide solutions were prepared by polymerization of the aromatic tetracarboxylic acid components and the aromatic diamine components shown in Table 1 in the same manner described in Reference Example 1.

In the Reference Example 3, a mixture of the components set to gel immediately after raised to 180° C.

Determined solution viscosities (rotational viscosities) at 100° C. of the aromatic polyimide solutions obtained in Reference Examples other than Reference Example 3 were set forth in Table 1.

The logarithmic viscosities of the polymers in the aromatic polyimide solutions obtained in Reference Examples 5, 7, 8 and 10 were found to be 1.0, those in Reference Examples 4 and 6 were 0.9 and those in Reference Examples 2 and 9 were 1.1 (determined conditions were the same as in Reference Example 1).

REFERENCE EXAMPLE 11 (PREPARATION OF POLYIMIDE)

A separable flask equipped with a stirrer and a conduit for introducing thereinto nitrogen gas, was charged with a mixture of 99 mmol of 2,2-bis(3,4-dicarboxyphenyl)-hexafluoropropanic dianhydride, 100 mmol of 1,3-diamino 4,6-dimethylbenzene and 309 g of p-chlorophenol. The reaction mixture was subjected to a polymerization procedure at 180° C. for 58 hours while the mixture was stirred and nitrogen gas flowed through the conduit and flask. The viscosity of the obtained reaction solution was found to be not more than 1 P (at 100° C.), and it meant that a polyimide having a high molecular weight was not produced. Therefore, a dope solution (polyimide solution) usable for spinning a hollow fiber membrane was not be prepared.

In other words, an aromatic polyimide of high degree of polymerization is not always prepared by polymerization of 2,2-bis(3,4-dicarboxyphenyl)hexafluoropropanic dianhydride with an aromatic diamine of diaminobenzene-type.

The results are set forth in Table 1, wherein the abbreviations means the following compounds:
S-BPDA : 3,3',4,4'-biphenyltetracarboxylic dianhydride
6-FDA : 2,2-bis(3,4-dicarboxyphenyl)hexafluoropropanic dianhydride
PMDA : pyromellitic dianhydride
TSN : 3,7-diaminodimethyldiphenylenesulfone
DADE : 4,4'-diaminodiphenylether
DABA : 3,5-diaminobenzoic acid
DMTX : 3,7-diamino-2,8-dimethylthioxanthene-5,5-dioxide
DADM : 4,4'-diaminodiphenylmethane

TABLE 1

| Ref. Ex. | Monomer Components | | | | Viscosity of Polymer Solution at 100° C./ P |
|---|---|---|---|---|---|
| | Acid Comp./ mmol | | Diamine Comp./ mmol | | |
| 1 | 6-FDA | 20 | TSN | 90 | 1,135 |
| | PMDA | 20 | DADE | 10 | |
| | S-BPDA | 59 | | | |
| 2 | 6-FDA | 50 | TSN | 90 | 1,060 |
| | PMDA | 5 | DABA | 10 | |
| | S-BPDA | 44 | | | |
| 3 | 6-FDA | 54 | TSN | 90 | — |
| | PMDA | 45 | DADE | 10 | |
| 4 | 6-FDA | 98 | TSN | 30 | 800 |
| | | | DADE | 70 | |
| 5 | 6-FDA | 79 | TSN | 90 | 871 |
| | PMDA | 20 | DADE | 10 | |
| 6 | 6-FDA | 79 | TSN | 100 | 781 |
| | PMDA | 20 | | | |
| 7 | 6-FDA | 79 | TSN | 70 | 949 |
| | PMDA | 20 | DADE | 30 | |
| 8 | 6-FDA | 50 | TSN | 90 | 1,041 |
| | PMDA | 10 | DADE | 10 | |
| | S-BPDA | 39 | | | |
| 9 | 6-FDA | 50 | TSN | 90 | 1,097 |
| | PMDA | 30 | DADM | 10 | |
| | S-BPDA | 19 | | | |
| 10 | 6-FDA | 79 | DMTX | 90 | 1,004 |
| | PMDA | 20 | DADE | 10 | |

EXAMPLES 1-6 (PREPARATION OF GAS SEPARATING HOLLOW FIBER MEMBRANE)

Dope solutions for spinning were independently prepared by filtrating the aromatic polyimide solutions obtained in Reference Examples 5-10 over stainless steel wire nets of 400 mesh.

A spinning apparatus equipped with a hollow filament spinning nozzle (external diameter of the round aperture: 1,000 μm; slit width of the round aperture: 200 μm; external diameter of the core aperture: 400 μm) was charged with each dope solution and then each dope solution was extruded to a nitrogen gas atmosphere from the spinning nozzle to form a hollow filament. Each obtained hollow filament was introduced into a primary coagulation liquid of 65 wt. % ethanol aqueous solution (at 0° C.) and then force to run between a pair of guide rolls in a secondary coagulation liquid (at approximately 0° C.) in a secondary coagulation apparatus provided with the guide rolls to give an asymmetric hollow fiber membrane of an aromatic polyimide. The fiber membrane was pulled out by a pulling roll (at the rate of 15 m/minute).

Finally, each obtained asymmetric hollow fiber membrane was wound up around a bobbin. A remaining coagulation liquid (ethanol) was thoroughly washed out with ethanol, and subsequently the ethanol was replaced with iso-octane (i.e., substituting solvent), which was dried at 100° C. The fiber membrane was then subjected to heat treatment for 30 minutes at a temperature shown in Table 2 to prepare a dry and heat-treated gas separating asymmetric hollow fiber membrane made of aromatic polyimide.

Results of measurement for gas permeating properties (gas transmission rate and gas selectivity) of the obtained gas separating asymmetric hollow fiber membranes made of aromatic polyimide are also set forth in Table 2.

The gas permeating property was measured in the following manner.

First of all, a hollow fiber element for estimating gas permeating property was composed of the asymmetric hollow fiber membrane prepared above, a stainless steel pipe and epoxy-type adhesive.

Then, by means of the above hollow fiber element installed in a container made of stainless steel, a gas permeating test was carried out for a mixture of hydrogen gas and methane gas, a mixture of carbon dioxide gas and methane gas, and a mixture of oxygen gas and nitrogen gas, separately, at 50° C. and the pressure was 10 kg/cm$^2$. Gas transmission rates and the ratios of gas transmission rates (which mean selective permeabilities) were calculated from measured gas chromatography analysis.

Mechanical properties of obtained asymmetric hollow fiber membranes were measured in a following manner.

Test pieces for measuring the mechanical property were prepared by sticking the asymmetric hollow fiber membrane prepared above to a paper frame having an inside dimension of width of 0.5 cm and length of 2 cm with epoxy-type adhesive. The test piece was set to a tensile tester which was placed in a room controlled at 25° C. and was subjected to tensile test at a tensile rate of 10 mm/min. On the other hand, a cross section of each of the asymmetric hollow fiber membranes was determined by observation under a microscope, and from measured values of the tensile test and values of the cross section, values of breaking strength, values of Young's modulus in tension and values of elongation were calculated.

The results of measurement for mechanical property are set forth in Table 3.

COMPARISON EXAMPLES 1-3 (PREPARATION OF GAS SEPARATING HOLLOW FIBER MEMBRANE)

The procedure of Example 1 was repeated except using aromatic polyimide solutions obtained in Reference Examples 1, 2 and 4 to prepare asymmetric hollow fiber membranes.

Gas permeating property of each asymmetric hollow fiber membrane was measured in the same manner as described in Example 1.

Gas permeating properties of obtained asymmetric hollow fiber membranes are set forth in Table 2 and their mechanical properties set forth in Table 3.

TABLE 2

| Aromatic Polyimide | | Temp. of Heat/ °C. | Gas Permeating Property of Membranes | | | | | | |
|---|---|---|---|---|---|---|---|---|---|
| | | | Gas trans. Rates* ($\times 10^{-5}$) | | | Gas selectivity** | | | |
| | | | $PH_2$ | $PCO_2$ | $PO_2$ | $PH_2/PCH_4$ | $PCO_2/PCH_4$ | $PO_2/PN_2$ | $PH_2/PN_2$ |
| Ex. | R. Ex. | | | | | | | | |
| 1 | 5 | 330 | 81 | 23 | 9.6 | 75 | 21 | 4.7 | 40 |
| 2 | 6 | 330 | 72 | 20 | 8.3 | 74 | 21 | 4.8 | 42 |
| 3 | 7 | 330 | 73 | 21 | 8.9 | 66 | 19 | 4.4 | 36 |
| 4 | 8 | 270 | 78 | 22 | 9.8 | 78 | 22 | 4.9 | 39 |
| 5 | 9 | 270 | 74 | 20 | 8.5 | 79 | 21 | 4.9 | 43 |

TABLE 2-continued

| | Temp. of Heat/ °C. | Gas Permeating Property of Membranes | | | | | | |
|---|---|---|---|---|---|---|---|---|
| | | Gas trans. Rates* | | | Gas selectivity** | | | |
| Aromatic Polyimide | | $PH_2$ | $PCO_2$ ($\times 10^{-5}$) | $PO_2$ | $PH_2/ PCH_4$ | $PCO_2/ PCH_4$ | $PO_2/ PN_2$ | $PH_2/ PN_2$ |
| Ex. | R. Ex. | | | | | | | |
| 6 | 10 | 330 | 79 | 22 | 9.5 | 76 | 21 | 4.7 | 39 |
| C. Ex. | R. Ex. | | | | | | | |
| 1 | 1 | 270 | 26 | 6.8 | 1.6 | 105 | 27 | 4.6 | 75 |
| 2 | 2 | 270 | 77 | 20 | 8.4 | 77 | 20 | 4.8 | 44 |
| 3 | 4 | 330 | 78 | 19 | 7.2 | 33 | 8 | 2.3 | 25 | note:
*$cm^3/cm^2 \cdot sec \cdot cmHg$
**selective permeability

TABLE 3

| | Temp. of Heat/ °C. | Mechanical Property of Membranes | | |
|---|---|---|---|---|
| Aromatic Polyimide | | Breaking strength ($kg/mm^2$) | Young's modulus ($kg/mm^2$) | Elongation (%) |
| Ex. | R. Ex. | | | |
| 1 | 5 | 330 | 5.1 | 76 | 22.8 |
| 2 | 6 | 330 | 5.2 | 81 | 25.3 |
| 3 | 7 | 330 | 4.9 | 73 | 20.5 |
| 4 | 8 | 270 | 4.8 | 78 | 17.3 |
| 5 | 9 | 270 | 5.4 | 85 | 32.4 |
| 6 | 10 | 330 | 5.0 | 75 | 20.1 |
| C. Ex. | R. Ex. | | | |
| 1 | 1 | 270 | 5.3 | 88 | 27.3 |
| 2 | 2 | 270 | 3.7 | 75 | 6.8 |
| 3 | 4 | 330 | 2.9 | 73 | 5.1 |

We claim:

1. A gas separating asymmetric hollow fiber membrane of an aromatic polyimide comprising a homogeneous layer and a porous layer which comprises recurring units of the formulae (I), and (II):

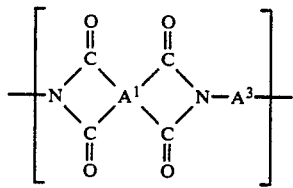 (I)

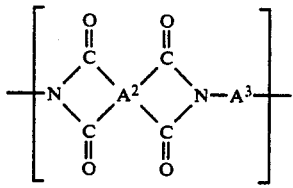 (II)

wherein $A^1$ is a tetravalent unit having a diphenylhexafluoropropane structure expressed by the formula (III):

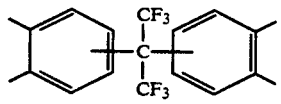 (III)

$A^2$ is a tetravalent unit having a benzene structure expressed by the formula (IV):

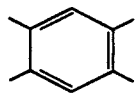 (IV)

and $A^3$ is a divalent unit selected from the group consisting of a unit expressed by the formula (VI):

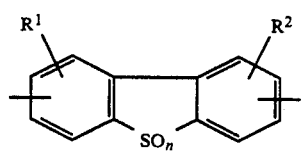 (VI)

in which $R^1$ and $R^2$ independently represent hydrogen or an organic group and n is 0, 1 or 2, and a unit expressed by the formula (VII):

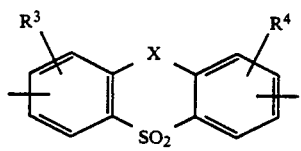 (VII)

in which $R^3$ and $R^4$ independently represent hydrogen or an organic group and X is —$CH_2$— or —CO—, said aromatic polyimide containing the recurring unit of the formula (I) in an amount of 40 to 90 molar % and the recurring unit of the formula (II) in an amount of 10 to 40 molar %.

2. A gas separating asymmetric hollow fiber membrane of an aromatic polyimide comprising a homogeneous layer and a porous layer which comprises recurring units of the formulae (I), (II), (VIII) and (IX):

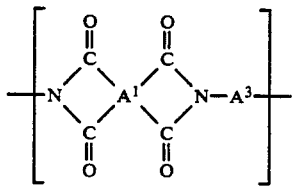 (I)

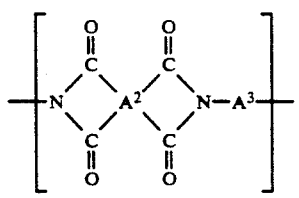

(II)

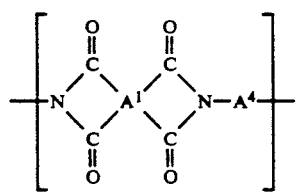

(VIII)

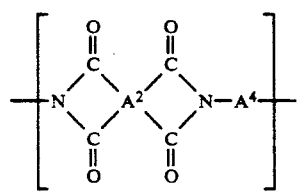

(IX)

wherein

A¹ is a tetravalent unit having a diphenylhexafluoropropane structure expressed by the formula (III):

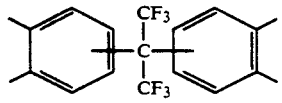

(III)

A² is a tetravalent unit having a benzene structure expressed by the formula (IV):

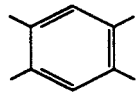

(IV)

A³ is a divalent unit selected from the group consisting of a unit expressed by the formula (VI):

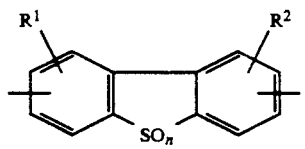

(VI)

in which $R^1$ and $R^2$ independently represent hydrogen or an organic group and n is 0, 1 or 2, and a unit expressed by the formula (VII):

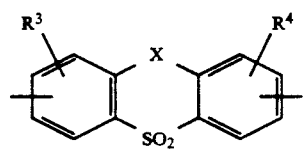

(VII)

in which $R^3$ and $R^4$ independently represent hydrogen or an organic group and X is —CH$_2$— or —CO—, and A⁴ is a divalent unit which is obtained by eliminating amino groups from an aromatic diamine having at least two benzene rings, said aromatic polyimide containing the recurring units of the formulae (I) and (VIII) in an amount of 40 to 90 molar %, the recurring units of the formulae (II) and (IX) in an amount of 10 to 40 molar %, and the recurring units of the formulae (I) and (II) in an amount of not less than 35 molar %.

3. The membrane of claim 2 wherein A⁴ is a divalent unit obtained by eliminating amino groups from an aromatic diamine selected from the group consisting of diaminodiphenylethers, diaminodiphenylmethanes, diaminobibenzyls, diaminobenzophenones, bis(aminophenyl)propanes, and benzidines.

4. The gas separating asymmetric membrane as defined in claim 1, wherein said aromatic polyimide contains the recurring unit of the formula (II) in an amount of 10 to 35 molar %.

5. The gas separating asymmetric membrane as defined in claim 1, wherein said aromatic polyimide further has as tetravalent unit a biphenyl structure expressed by the formula (V):

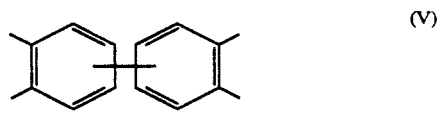

(V)

6. The gas separating asymmetric membrane as defined in claim 1, wherein each of $R^1$, $R^2$, $R^3$ and $R^4$ independently is hydrogen or an alkyl group having 1 to 6 carbon atoms.

7. The gas separating asymmetric membrane as defined in claim 2, wherein said aromatic polyimide contains the recurring units of the formulae (II) and (IX) in an amount of 10 to 35 molar %.

8. The gas separating asymmetric membrane as defined in claim 2, wherein said aromatic polyimide further has as tetravalent unit a biphenyl structure expressed by the formula (V):

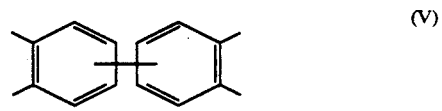

(V)

9. The gas separating asymmetric membrane as defined in claim 2, wherein each of $R^1$, $R^2$, $R^3$ and $R^4$ independently is hydrogen or an alkyl group having 1 to 6 carbon atoms.

10. A process for the preparation of a gas separating asymmetric hollow fiber membrane comprising a homogeneous layer and a porous layer which comprises the steps of:

preparing a dope solution of an aromatic polyimide which comprises recurring units of the formulae (I) and (II):

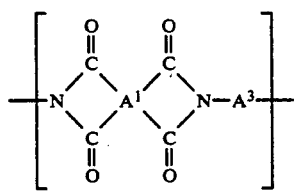

(I)

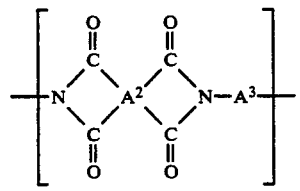

(II)

wherein $A^1$ is a tetravalent unit having a diphenylhexafluoropropane structure expressed by the formula (III):

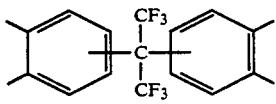

(III)

$A^2$ is a tetravalent unit having a benzene structure expressed by the formula (IV):

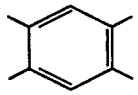

(IV)

and $A^3$ is a divalent unit selected from the group consisting of a unit expressed by the formula (VI):

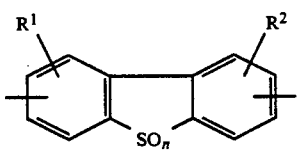

(VI)

in which $R^1$ and $R^2$ independently represent hydrogen or an organic group and n is 0, 1 or 2, and a unit expressed by the formula (VII):

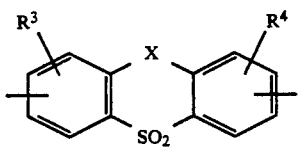

(VII)

in which $R^3$ and $R^4$ independently represent hydrogen or an organic group and X is $-CH_2-$ or $-CO-$, said aromatic polyimide containing the recurring unit of the formula (I) in an amount of 40 to 90 molar % and the recurring unit of the formula (II) in an amount of 10 to 40 molar %; dissolved in a polar organic solvent, extruding the dope solution from a spinning nozzle in the form of a hollow filament, and introducing the formed hollow filament into a coagulation liquid of a polar organic solvent to form a coagulated gas separating asymmetric hollow fiber membrane.

11. The process as defined in claim 10, wherein the polar organic solvent for the preparation of the dope solution is phenol, cresol, xylenol, catechol, 3-chlorophenol, 4-chlorophenol, 4-bromophenol, 2-chloro5-hydroxytoluene, N-methyl2-pyrrolidone, N,N-dimethylformamide, N,N-diethylformamide, N,N-dimethylacetamide or N,N-diethylacetamide.

12. The process as defined as claim 10, wherein the coagulating liquid comprises water, methanol, ethanol, n-propanol, isopropanol, acetone, methyl ethyl ketone, diethyl ketone, or ethyl propyl ketone.

13. The process as defined as claim 10, wherein the coagulating liquid is a mixture of water and at least one organic solvent selected from the group consisting of methanol, ethanol, n-propanol, isopropanol, acetone, methyl ethyl ketone, diethyl ketone, and ethyl propyl ketone.

* * * * *